Dec. 16, 1958  W. C. SCHMIDT  2,864,421
DOUBLE BLADE KNIFE
Filed June 27, 1956

INVENTOR.
WILLIAM C. SCHMIDT
BY
J. Warren Kinney Jr.
ATTORNEY

United States Patent Office 2,864,421
Patented Dec. 16, 1958

2,864,421

DOUBLE BLADE KNIFE

William C. Schmidt, Cincinnati, Ohio, assignor to The Cincinnati Butchers' Supply Company, Cincinnati, Ohio, a corporation of Ohio Application June 27, 1956, Serial No. 594,284

1 Claim. (Cl. 146—106)

The present invention relates to a double blade rotary mincing or chopping knife of a type adapted for comminuting meats or meat products in large quantities and at a rapid rate.

The knives usually are fixed transversely upon a rapidly rotating shaft in side by side, spaced relationship, with the blades thereof projecting from the shaft at different angles to one another. For example, if two knives of the type shown in Fig. 1 were mounted upon a shaft passing through the central hub apertures thereof, the knives would ordinarily be fixed upon the shaft with the blades arranged ninety degrees apart, this resulting in a perfectly balanced assembly. In another example, three such knives might be mounted upon the shaft, in which event the blades preferably would be located at a sixty-degree angularity from one another. In practice, the shaft will carry an even greater number of double blade knives, all preferably arranged in balanced sets of two or three, and the sharpened tips of all the blades will sweep transversely across a semi-circular trough containing the product or material to be chopped or minced.

In the commercial mincing or chopping machine, the trough is circular and in the form of a wheel mounted for slow rotation about a vertical axis, with the continuous trough open at the top. The knives are arranged to rotate partly within the trough, transversely thereof, with the tips of the blades moving very close to the trough bottom. The concavity of the trough usually is formed on a radius approximating or slightly exceeding the radius of the circle described by the blade tips as the knife shaft rotates, so that any material resting within the trough is subject to the mincing action of the blades. As the wheel carrying the trough is rotated, the product within the trough is brought repeatedly to the knife station and is minced to any desired degree depending upon the number of knives employed and the number of times the trough wheel is rotated.

A typical machine of the kind above referred to is disclosed in the United States patent of Zaenkert, numbered 2,549,657, and dated April 17, 1951.

An object of the present invention is to provide an improved knife for mincing and chopping machines, which is greatly superior in effectiveness and durability, to other knives for the same purpose heretofore employed in the industry.

Another object of the invention is to produce a knife of the character stated which may be manufactured at extremely low cost and without the production of rejects or knives unsafe to use.

Another object is to produce an improved knife for the purposes stated, which will not unduly heat the perishable product undergoing mincing, but will so manipulate the product as to encourage cooling thereof in the course of treatment.

A further object is to so construct a knife of the kind referred to, as to minimize the power requirement of the machine in which it is installed.

Still another object is to provide a mincing or chopping knife which performs to advance the product within the trough, and effectively condition the product for subsequent repetition of the mincing or chopping operation.

A further object of the invention is to provide simple means in association with a knife of the character stated, for effectual and accurate adjustment of its blade upon the knife shaft to compensate for any loss of blade length due to wear or reconditioning of the blade.

The foregoing and other objects are attained by the means described herein and illustrated upon the accompanying drawing, in which.

Figure 1:
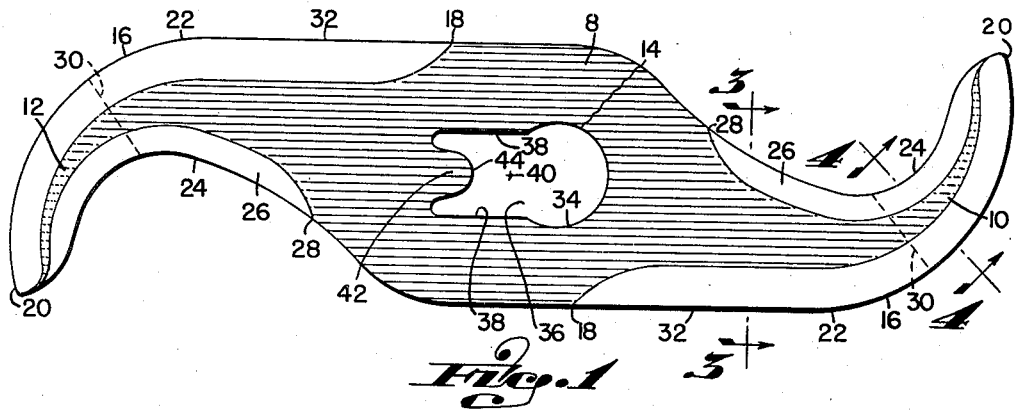
Fig. 1 is a plan view of the improved double blade rotary knife of the invention.

Referring to the drawing, the knife is seen to consist of a single plate of steel or other suitable metal, developed to provide a hub portion 8 and a pair of outwardly extending diametrically opposed blades 10 and 12. At the approximate center of the hub portion, the knife is provided with an aperture 14 adapted to accommodate a rotary shaft as previously explained, whereby the knife may be rotated at high speed to advance the leading edges 16 of its blades through a substance or material to be minced. The direction of blade advancement, in the Fig. 1 disclosure, is clockwise.

The leading edge 16 of each blade may be skived to furnish a sharp cutting edge extending from the hub at 18 outwardly to the tip 20, and about half the length of said cutting edge is straight and tangential to the hub, from the point 18 outwardly to the location 22. The remaining portion of the cutting or leading edge from 22 outwardly to tip 20 is curved on a radius shorter than the length of a blade 12, so that the tip 20 may reach the trough bottom while successive points on the leading edge extending from 20 to 22 are disposed at progressively greater distances from the trough bottom, thereby to ensure performance of a true slicing action of the curved edge upon the substance held by the trough. The straight portions of the leading edges, from the hub outwardly to the beginning of the curves at 22, 22, may be substantially parallel to one another as shown, and from the locations 22, 22 outwardly, the blades are curved reversely to the direction of blade advancement.

The rtailing edges 24, 24 of the blades are not to be sharpened, by preference, but each is to be chamfered at 26 from the hub location 28 outwardly to tip 20 where the trailing edge 24 converges with the leading edge 16. The reduced thickness of the trailing edge eliminates formation of an air pocket following the blade as the latter is advanced rapidly through the mass of material undergoing mincing, and by this means is avoided a substantial amount of drag which would otherwise tend to carry some of the material along with the blade, and displace it from the trough. The form of the trailing edge as disclosed, therefore, is advantageous for ensuring clean slicing of the mass within the trough, while at the same time minimizing the power requirement for rotating the knife shaft due to reduction of drag upon the blades of the knife.

From the disclosure of Fig. 1, it will be evident that the knife may be stamped or otherwise formed from an initially flat plate of metal rectangular in form, without undue waste of metal. The tip 20 of blade 12 may be located substantially upon a straight line constituting an imaginary extension of the straight portion of leading edge 16 of the other blade 10, and likewise, the tip of blade 10 may rest substantially upon a straight line which constitutes an imaginary extension of the leading edge blade 12, between the points 18 and 22. Such disposition of the blade tips not only results in conservation of metal, but in addition, places the cutting edges of the tips in the most effective position for clean slicing of the material in the trough, as the tips thereby are disposed tangentially to the curvature or concavity of the trough bottom. The blade as initially formed will be substantially S-shaped of configuration, as the drawing indicates.

Figure 2:
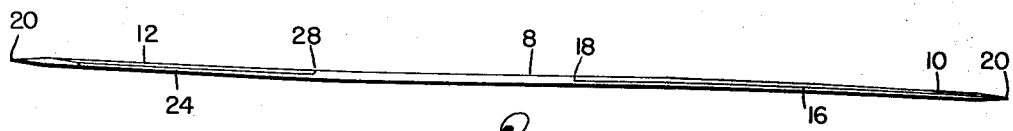
Fig. 2 is a side elevational view of the same.
Figure 3:
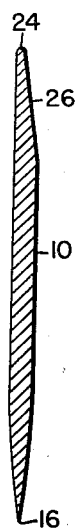
Fig. 3 is an enlarged cross-sectional view taken on line 3—3 of Fig. 1.
Figure 4:
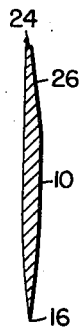
Fig. 4 is an enlarged cross-sectional view taken on line 4—4 of Fig. 1.

In the preferred form of the knife, the hub portion located inwardly of the points 18 and 28 is of uniform thickness, and the blades outwardly of said limits are gradually decreased in thickness, or feathered, to the tips 20 of the blades as indicated by Fig. 2. To be noted also is the gradual reduction in the width of each blade from the region of the hub portion to the tips of the blades. This results in a gradual increase of flexibility of the knife from the center outwardly, and favors ease of slicing with minimum heating and displacement of minced material from the trough as the knife progresses therethrough.

It is considered advantageous to shift the material undergoing mincing, in a direction lengthwise of the trough, or transversely of the direction of knife travel, in order to subject the minced material to different areas of the trough surface. This shifting of the material is advantaneous whether the trough is one heated to cook the material, or one which merely supports the material during mincing at room temperature. If the trough is a cooker, then shifting of the material during mincing ensures uniformity in heating and cooking of the material. On the other hand, if the trough is either unheated or refrigerated, the shifting of the material to different areas of the trough prevents concentration of heat at the knife zone and thereby arrests any tendency of the material to decompose and lose its wholesomeness during the mincing operation. The shifting of material undergoing treatment is induced by action of the knife blades, in accordance with the present invention, by virtue of the blade construction explained as follows:

Referring to Fig. 2, it may be noted that the end portions of the blades are biased to opposite sides of the mean plane of the knife, the blades being bent or otherwise offset laterally in opposite directions along the broken lines 30 shown in Fig. 1. The line of offset for each blade may span the curved portion of the blade, at a location intermediate the tip 20 and the straight section 32 of its leading edge. With this construction, the knife blades in advancing through the material undergoing treatment, will each describe a helical path, with the result that during the mincing operation the material is bodily shifted along the trough in the direction of the knife shaft axis, or transversely to the plane of knife rotation. Accordingly, with each complete rotation of the knife two full spirals are described, one by each blade. The extent to which shifting of the material is accomplished may be regulated by increasing or decreasing the offset of the ends of the blades more or less, as may be desired.

Attention is now directed to the hub aperture 14, which as shown is of substantial key-hole configuration. The circular portion 34 of the aperture is slightly larger in diameter than the knife shaft which it accommodates, and in the direction of the major axis of the knife a constricted throat 36 is provided, bounded by the straight parallel edges 38. These edges are adapted to receive a pair of flats formed on the shaft, so that when the flats of the shaft are in registry with the spaced parallel edges 38, 38 of the knife, rotation of the knife relative to the shaft is impossible.

From the foregoing it will be apparent that the circular portion 34 of the aperture 14 must be offset from the exact middle point of the knife, which latter point is to be found located at a distance from the center of circle 34, and between the edges 38, 38, upon the major axis of the knife. The middle point of the knife then, may be located at 40, which is a point coinciding substantially with the knife shaft axis when the knife is new. An inwardly directed integral tongue 42 projects into the space between the opposed edges 38, 38, and provides an abutment or nose 44 against which the shaft exterior may abut while the flats of the shaft engage the edges 38, 38. The knife may be secured in this position against lateral shifting axially of the shaft, usually by means of a nut, not shown.

Now when the knife blades wear and require sharpening, usually by grinding the leading edges 16, 16, the tip 20 of one blade such as 10 may have to be extended slightly in order to restore its proper cutting relationship to the trough surface. In that event, the amount by which the blade 10 is shortened by grinding, may be added to the blade length by removing a corresponding amount of metal from the nose of tongue 42, thereby permitting the shaft to rest in the aperture throat closer to the base of the tongue, which results in disposition of the tip of blade 10 to the original position with respect to its distance from the shaft axis. By so compensating for loss of metal removed in grinding the tip of blade 10, the knife may be maintained always in proper position for effective mincing of material subjected thereto.

The improved knife herein disclosed is highly effective for the rapid and economical mincing or chopping of products such as fresh meats, and its design is such as to play an important part in preserving the wholesomeness of the product by avoiding undesirable frictional heating thereof. The knife moreover is simple and inexpensive to manufacture, and its useful life is of long duration as compared with that of knives heretofore employed in the industry. Other objects and advantages have been previously related herein, and need not be restated in the conclusion.

It is understood that various modifications and changes in materials and in the structural details of the knife may be resorted to, within the scope of the appended claim, without departing from the spirit of the invention.

What is claimed is:

A double blade rotary mincing knife constituted of an initially flat S-shaped plate, comprising an apertured enlarged hub portion of uniform thickness, and diametrally opposed blades extending from the hub portion, said blades being progressively reduced in thickness and in width from the hub portion outwardly, and each having a sharpened tip, and a leading edge and a trailing edge converging at the tip, substantially half of the length of each leading edge being straight from the hub outwardly, and in tangential relationship to the hub, the remainder of each leading edge being sharpened and curved reversely to the direction of blade advancement to the extent of locating the tip of one blade substantially on an imaginary straight line which includes the straight leading edge of the other blade, a chamfer along and on one side only of the trailing edge of each blade to relieve and minimize drag as the blades advance through a material undergoing mincing, said blades being slightly bent in opposite directions from the mean plane of the knife, each along a transverse line which spans the curved portion of the blade at a location intermediate the tip and the straight section of the leading edge.

References Cited in the file of this patent

UNITED STATES PATENTS

| 774,155 | Butterfield | Nov. 8, 1904 |
| 2,635,663 | Schmidt | Apr. 21, 1953 |

FOREIGN PATENTS

| 200,502 | Germany | July 22, 1908 |
| 24,924 | Finland | Oct. 12, 1951 |